(12) United States Patent
Sennett et al.

(10) Patent No.: US 8,369,488 B2
(45) Date of Patent: Feb. 5, 2013

(54) TRIGGERING A 911 VOICE CALL FROM A NON-VOICE MESSAGE

(75) Inventors: Dewayne Sennett, Redmond, WA (US); Brian Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 150 days.

(21) Appl. No.: 13/048,346

(22) Filed: Mar. 15, 2011

(65) Prior Publication Data

US 2012/0237002 A1    Sep. 20, 2012

(51) Int. Cl.
*H04M 11/04*    (2006.01)
(52) U.S. Cl. .......................... 379/45; 379/37; 455/404.2
(58) Field of Classification Search .................... 379/37, 379/45; 455/404.2
See application file for complete search history.

(56) References Cited

U.S. PATENT DOCUMENTS

| 2011/0081010 | A1* | 4/2011 | Mitchell | 379/142.06 |
|---|---|---|---|---|
| 2011/0086607 | A1* | 4/2011 | Wang et al. | 455/404.1 |
| 2011/0151829 | A1* | 6/2011 | Velusamy et al. | 455/404.2 |
| 2011/0258266 | A1* | 10/2011 | Serra et al. | 709/206 |
| 2012/0149324 | A1* | 6/2012 | Daly | 455/404.1 |
| 2012/0214437 | A1* | 8/2012 | Ray et al. | 455/404.2 |

* cited by examiner

*Primary Examiner* — Creighton Smith
(74) *Attorney, Agent, or Firm* — Woodcock Washburn LLP

(57) ABSTRACT

A voice based emergency call, such as a call to 911, is provided to a public safety answering point (PSAP) triggered from a non-voice based emergency call. When a non-voice based call is sent to a PSAP that does not accept non-voice based calls, upon determining that the PSAP can not handle non-voice based calls, the communication network is utilized to establish a voice based call with the PSAP.

20 Claims, 10 Drawing Sheets

TRIGGERING A 911 VOICE CALL FROM A NON-VOICE MESSAGE

TECHNICAL FIELD

The technical field generally relates to public safety, and more specifically relates to providing a 911 voice call from a non-voice message.

BACKGROUND

Typically, in a emergency situation, an individual calls 911. More currently however, the popularity of text messaging has grown to the point that many people prefer sending and receiving a text message rather than making and receiving a voice based call. However, not all systems are capable of handling non-voice 911 messages.

SUMMARY

Systems and methods are described for providing a voice based emergency call, such a call to 911, from a non-voice message. There is no known mandate that requires a public safety answering point (PSAP) to support non-voice 911 type calls. Thus, it is possible to contemplate a situation in which a subscriber can travel to and from areas that do, and do not, support non-voice 911 type calls. As described herein, when a subscriber is in a boundary area of a PSAP which does not support non-voice to 911 communications, rather than the subscriber's attempt to send the non-voice message to the 911 call center failing, a voice call is generated and/or triggered, and sent to the PSAP.

DETAILED DESCRIPTION OF ILLUSTRATIVE EMBODIMENTS

Figure 1:
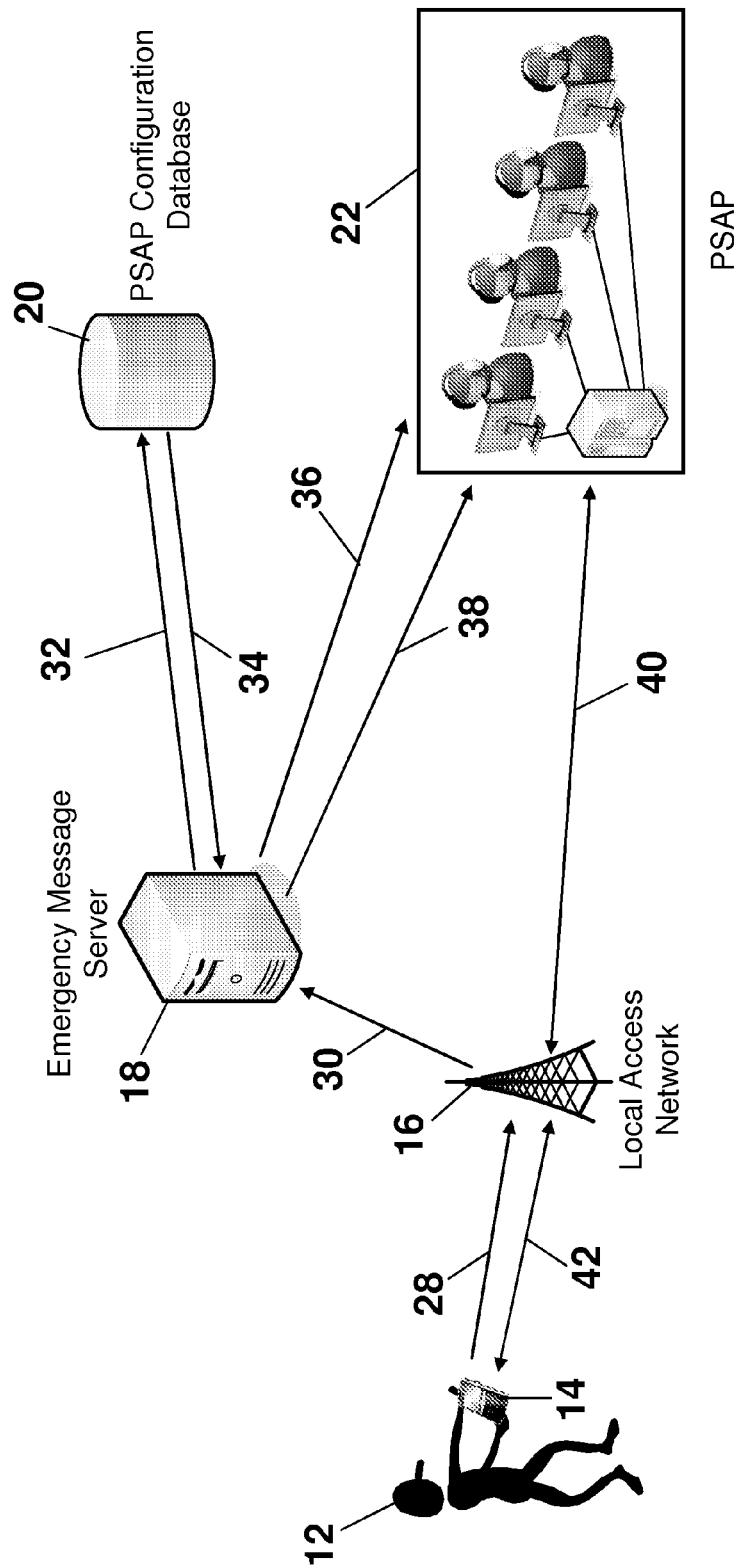
FIG. 1 illustrates an example system and process for providing an emergency voice call from a non-voice message.

FIG. 1 illustrates an example system and process for providing a 911 voice call from a non-voice message. As depicted in FIG. 1, a user (subscriber) 12, wants to make an emergency call to an emergency service, for example (e.g., to 911). The user 12 can start an application that has previously been installed on his/her communications device 14. The application can provide the user 12, via a user interface, or the like, on the communications device 14, the option to initiate a non-voice based (e.g., text based) session. In an example configuration, a text based session could automatically be initiated via preferences in the user's profile. The user 12 could compose the non-voice message utilizing SMS, IM, email, or the like, or a combination thereof. The user 12, via the communications device 14, can assign the message a special short code or telephone number that may be designated for non-voice to 911 emergency messages.

At steps 28 and 30, the communications device 14 sends the non-voice message to an emergency message server 18 via a local access network (e.g., radio access network or the like) 16. The emergency message server 18 can comprise any appropriate network entity, such as, for example, a Short Message Service Center (SMSC) for a Short Message Service (SMS) message. Upon receipt of the non-voice message, the emergency message server 18 determines that the message is an emergency non-voice message. This determination can be done in any appropriate manner. For example, the communications device 14 can determine that the message is a non-voice emergency message and can mark the message as an emergency message when it is sent to the network using methods available in the signaling protocols. The communications device 14 can determine that this is an emergency message, for example, by examining the entered address or by having a special "send emergency message" button or application on the communications device 14. As another example, the emergency message server 18 can make this determination based upon the entered address or access point name used to send the message.

At step 32, the emergency message server 18 queries the public safety answering point (PSAP) configuration database 20 to identity which PSAP serves the current location of the communications device 14. The location of the communications device 14 can be determined via any appropriate means. For example, the communications device 14 and/or the communications network can determine the geographical location of the communications device 14 through any type of location determination system including, for example, the Global Positioning System (GPS), assisted GPS (A-GPS), time difference of arrival calculations, configured constant location (in the case of non-moving devices), beacon technologies, any combination thereof. In an example embodiment, the location of the communications device 14 is provided to the emergency message service as part of the non-voice message. At step 34, the PSAP configuration database 20 responds to the query with configuration information for the identified PSAP. In an example configuration, the response provided by the PSAP configuration database 20 includes an indication as to whether the identified PSAP accepts non-voice messages. If the identified PSAP accepts non-voice messages (e.g., the response provided by the PSAP configuration database 20 comprises an indication that the identified PSAP accepts non-voice messages), the non-voice message is routed, by the emergency message server 18, to the identified PSAP 22, at step 36.

If the identified PSAP does not accept non-voice messages, as indicated by the response provided at step 34 (e.g., the response message provided by the PSAP configuration database 20 comprises an indication that the identified PSAP does not accept non-voice messages), the emergency message server 18 will not attempt to deliver the non-voice message.

Rather, the emergency message server 18 may send a notification message, at step 38, to the identified PSAP 22 serving the location of the communications device 14. In an example embodiment, the notification message comprises instructions to initiate a voice based call between the communications device 14 and the identified PSAP. The emergency message server 18 could, via the notification message, notify the identified PSAP 22 that the communications device 14 having the indicated phone number has an emergency and that the PSAP call taker should place a voice call to that number. This will result, as depicted at steps 40 and 42, in a call taker at the PSAP 22 establishing an emergency services voice call between the communications device 14 and the PSAP 22 using the directory number of the communications device 14 which was provided in the original non-voice provided by the communications device 14 to the emergency message server 18.

The notification message provided at step 38 can be in the form of any appropriate message. For example, the notification message could be a text based message, such as an email, an instant message, or the like. The notification message could be sent to PSAP 22, the notification message could be sent to an individual call taker at the PSAP 22, the notification message could be sent to select call takers at the PSAP 22, or any combination thereof. In another example embodiment, the notification message can comprise voice call to the identified PSAP 22 wherein the voice call provides the indicated information to a call taker at the PSAP 22. The voice call can comprise any appropriate voice call. For example, the voice based call could be a phone call, the voice based call could be automated, the voice based call could be prerecorded, the voice based call could be digitally synthesized from the information in the message received at step 30, or any combination thereof. In an example embodiment, the call taker at the PSAP 22 has the ability to replay the voice call (e.g., in order to re-listen to vital information such as location, phone number, etc.).

Figure 2:
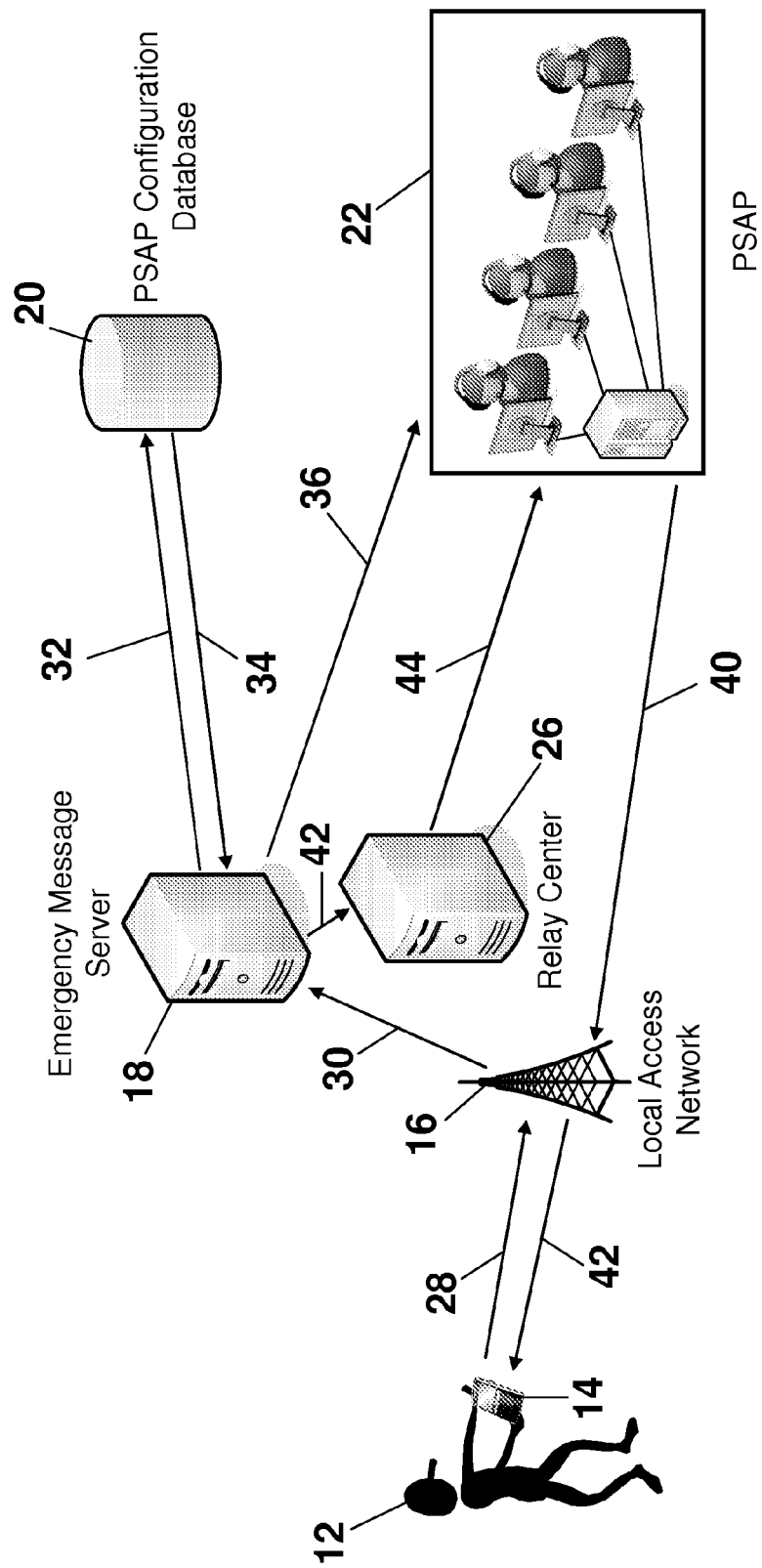
FIG. 2 illustrates another example system and process for providing an emergency voice call from a non-voice message.

FIG. 2 illustrates another example system and process for providing a 911 voice call from a non-voice message. In an example embodiment, rather than the emergency message server 18 sending the notification message to the identified PSAP 22 (e.g., step 38 in FIG. 1), the emergency message server 18 can, at step 42, send the notification message to an intermediate network entity, such as relay center 26, that will in turn, contact the PSAP, at step 44, with the information from the notification message. In an example embodiment, the notification message provided at step 44 by the relay center 26 can be in the form of any appropriate message. For example, the notification message could be a text based message, such as an email, an instant message, or the like. The notification message could be sent to PSAP 22, the notification message could be sent to an individual call taker at the PSAP 22, the notification message could be sent to select call takers at the PSAP 22, or any combination thereof. In another example embodiment, the notification message can comprise voice call to the identified PSAP 22 wherein the voice call provides the indicated information to a call taker at the PSAP 22. The voice call can comprise any appropriate voice call. For example, the voice call can be automated, the voice call can be prerecorded, the voice call can be digitally synthesized from the information in the message received at step 30, or any combination thereof. The relay center 26 could convert the information from the notification message to a voice based message. In an example embodiment, the call taker at the PSAP 22 has the ability to replay the voice call (e.g., in order to re-listen to vital information such as location, phone number, etc.).

Figure 3:
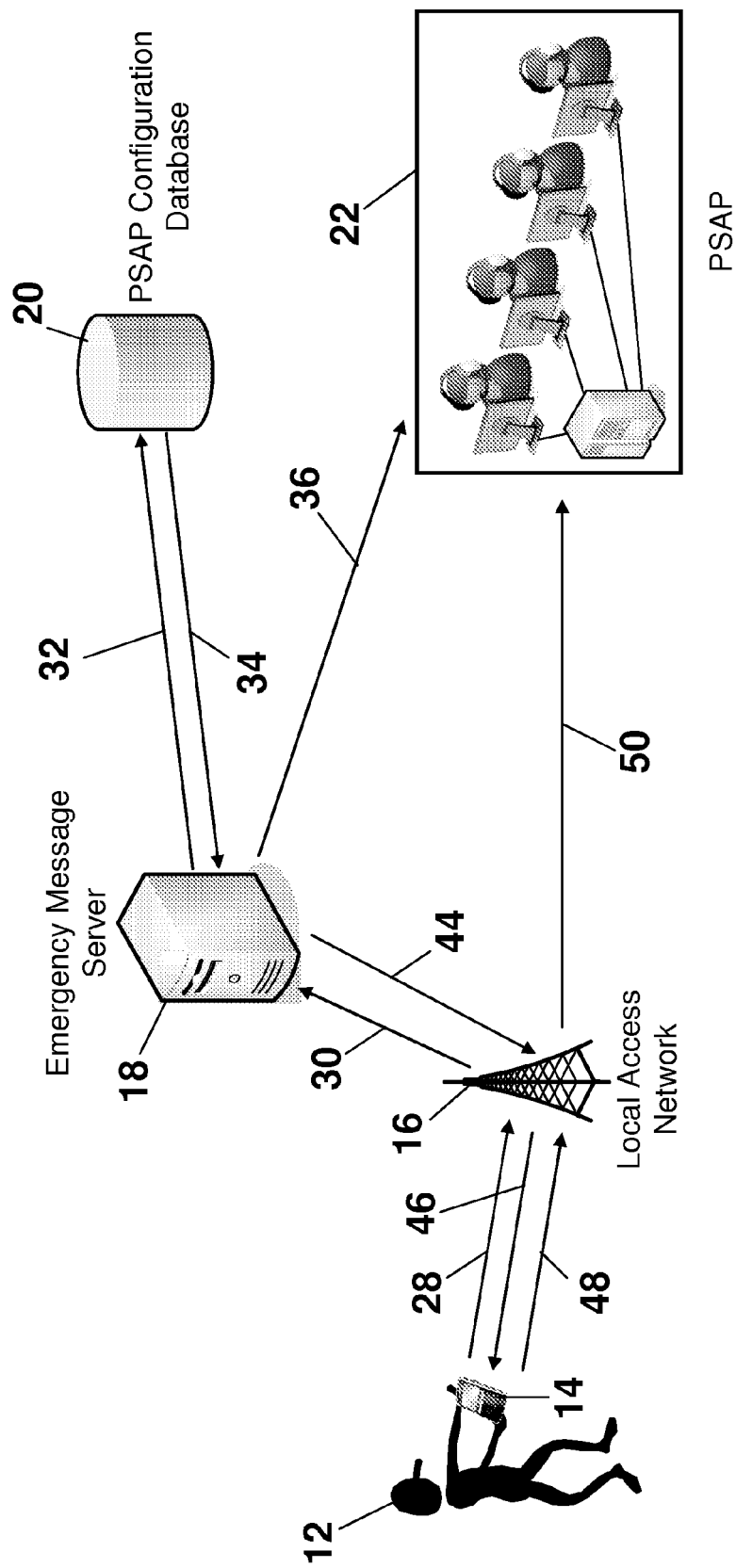
FIG. 3 illustrates another example system and process for providing an emergency voice call from a non-voice message.

FIG. 3 illustrates another example system and process for providing a 911 voice call from a non-voice message. In another example embodiment, if the PSAP 22 does not accept non-voice calls, rather than the emergency message server 18 sending a notification message to the PSAP 22, or to the relay center 26, the emergency message server 18 can provide an indication to the communications device 14 that the identified PSAP 22 does not accept non-voice calls, and the communications device can initiate subsequent action. In the following description of FIG. 3, steps 28 through 36 are essentially the same as described with respect to FIG. 1 and FIG. 2. However, for the sake of clarity, they are repeated below in the description of FIG. 3.

Accordingly, as depicted in FIG. 3, a user (subscriber) 12, wants to make an emergency call to an emergency service, for example (e.g., to 911). The user 12 can start an application that has previously been installed on his/her communications device 14. The application can provide the user 12, via a user interface, or the like, on the communications device 14, the option to initiate a non-voice based (e.g., text based) session. In an example configuration, a text based session could automatically be initiated via preferences in the user's profile. The user 12 could compose the non-voice message utilizing SMS, IM, email, or the like, or a combination thereof. The user 12, via the communications device 14, can assign the message a special short code or telephone number that may be designated for non-voice to 911 emergency messages.

At steps 28 and 30, the communications device 14 sends the non-voice message to an emergency message server 18 via a local access network (e.g., radio access network or the like) 16. The emergency message server 18 can comprise any appropriate network entity, such as, for example, a Short Message Service Center (SMSC) for an Short Message Service (SMS) message or a Multimedia Message Service Center (MMSC) for a Multimedia Messaging Service (MMS) message. Upon receipt of the non-voice message, the emergency message server 18 determines that the message is an emergency non-voice message.

At step 32, the emergency message server 18 queries the public safety answering point (PSAP) configuration database 20 to identity which PSAP serves the current location of the communications device 14. The location of the communications device 14 can be determined via any appropriate means. For example, the communications device 14 and/or the communications network can determine its own geographical location through any type of location determination system including, for example, the Global Positioning System (GPS), assisted GPS (A-GPS), time difference of arrival calculations, configured constant location (in the case of non-moving devices), beacon technologies, any combination thereof. In an example embodiment, the location of the communications device 14 is provided to the emergency message service as part of the non-voice message. At step 34, the PSAP configuration database 20 responds to the query with configuration information for the identified PSAP. In an example configuration, the response provided by the PSAP configuration database 20 includes an indication as to whether the identified PSAP accepts non-voice messages. If the identified PSAP accepts non-voice messages (e.g., the response provided by the PSAP configuration database 20 comprises an indication that the identified PSAP accepts non-voice messages), the non-voice message is routed, by the emergency message server 18, to the identified PSAP 22, at step 36.

In this example embodiment, if the identified PSAP does not accept non-voice messages, as indicated by the response provided at step 34 (e.g., the response message provided by the PSAP configuration database 20 comprises an indication that the identified PSAP does not accept non-voice messages), the emergency message server 18 will not attempt to deliver the non-voice message. Rather, the emergency message server 18 will send a message, at steps 44 and 46, back to the communications device 14, that non-voice to 911 is not available, or the like. This message can be in the form of any appropriate message. For example, this message could be can be a new message (e.g., an SMS teleservice message), an acknowledgement message to the original non-voice emergency message, wherein the acknowledgment message comprises an error code indicative of the PSAP not accepting non-voice message, or any appropriate combination thereof. In an example embodiment, the message includes an indication of the identified PSAP assigned to handle the current location of the communications device 14.

If the communications device 14 is configured to automatically initiate a 911 to voice call based on this received message, the communications device 14 will initiate an emergency service voice call (e.g., voice call with dialed digits equal to 911). The voice call proceeds, at steps 48 and 50, as an emergency service voice call just as if the subscriber 12 had actually entered the 911 dialed digits. In an example embodiment, the communications device 14 can use the indication of the identified PSAP that was received in the message provided at steps 44 and 46, to call the identified PSAP.

If the communications device 14 is configured to not automatically initiate a 911 call in this situation, then the communications device 14 can display a message on a display of the communications device 14 indicating that non-voice to 911 is not available in the subscriber's current location. The subscriber may then choose to manually initiate the voice emergency call. In an example embodiment, the display could provide an indication that a specific number should be called, for example a TTY communications number for the hearing impaired.

Figure 4:
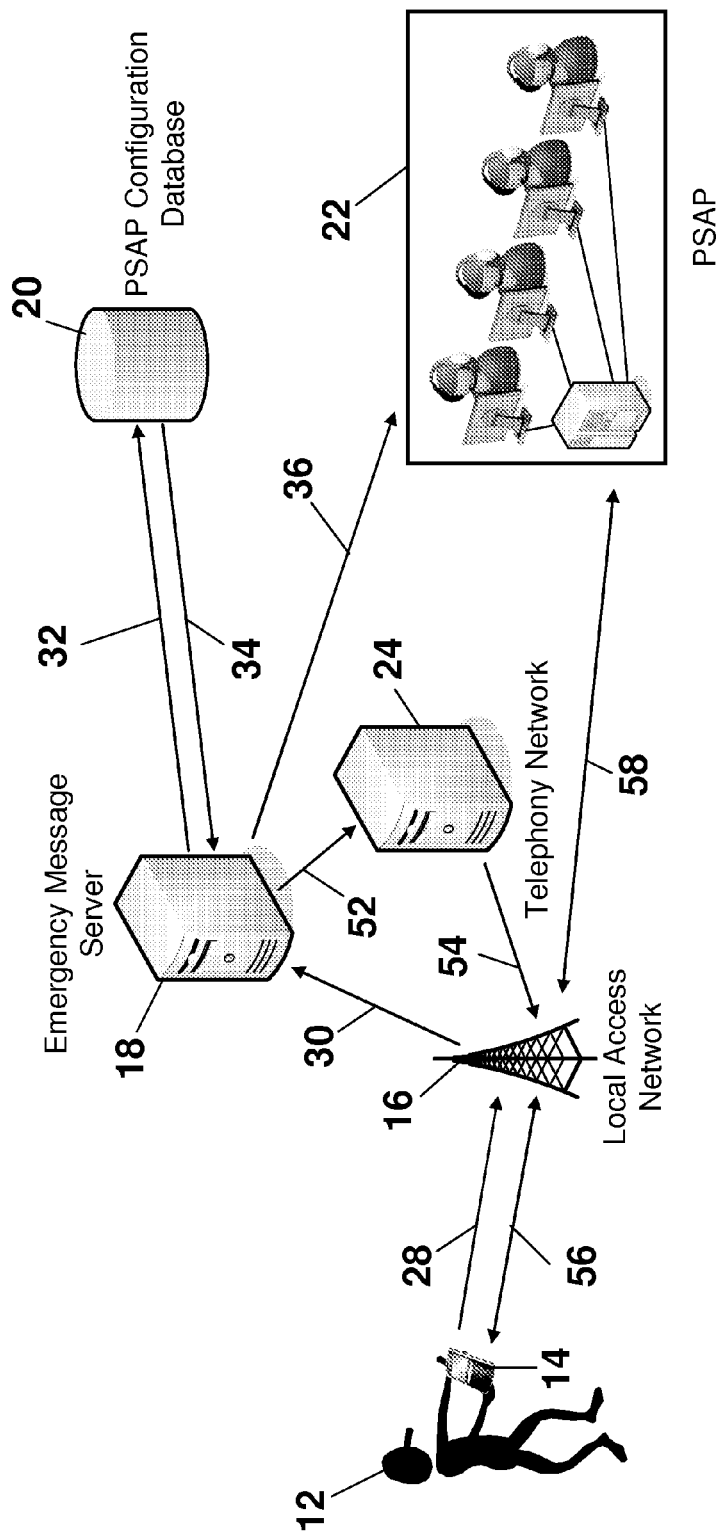
FIG. 4 illustrates another example system and process for providing an emergency voice call from a non-voice message.

FIG. 4 illustrates another example system and process for providing a 911 voice call from a non-voice message. In another example embodiment, if the PSAP 22 does not accept non-voice calls, rather than the emergency message server 18 sending a notification message to the PSAP 22, or to the relay center 26, the emergency message server 18 can send a request to instruct the telephony network to set up a voice communication path between the PSAP and the subscriber's device. This can be accomplished via any appropriate manner. For example, a Media Gateway Control Function (MGCF) and a Media Gateway (MGW) (see items 946 and 948 in FIG. 9) could be utilized. The emergency message server 18 could connect to the MGCF 946 and send it a request to set up a voice communications path between the handset and the PSAP. The MGCF 946 would select an appropriate available MGW 948 and could provide instructions for it to set up a voice communication path between the communications device 14 and the MGW 948, to also set up a voice communications path between the MGW 948 and the PSAP 22, and to bridge these two voice communications paths. The voice communications path between the handset set could be either analog voice or VoIP. The voice communication path between the MGW 948 and the PSAP 22 could be either analog voice or VoIP. The MGW 948 would do any required transcoding/translation functions as part of the bridging process as instructed by the MGCF 946.

In the following description of FIG. 4, steps 28 through 36 are essentially the same as described with respect to FIG. 1, FIG. 2, and FIG. 3. However, for the sake of clarity, they are repeated below in the description of FIG. 3.

Accordingly, as depicted in FIG. 4, a user (subscriber) 12, wants to make an emergency call to an emergency service, for example (e.g., to 911). The user 12 can start an application that has previously been installed on his/her communications device 14. The application can provide the user 12, via a user interface, or the like, on the communications device 14, the option to initiate a non-voice based (e.g., text based) session. In an example configuration, a text based session could automatically be initiated via preferences in the user's profile. The user 12 could compose the non-voice message utilizing SMS, IM, email, or the like, or a combination thereof. The user 12, via the communications device 14, can assign the message a special short code or telephone number that may be designated for non-voice to 911 emergency messages.

At steps 28 and 30, the communications device 14 sends the non-voice message to an emergency message server 18 via a local access network (e.g., radio access network or the like) 16. The emergency message server 18 can comprise any appropriate network entity, such as, for example, a Short Message Service Center (SMSC) for an Short Message Service (SMS) message. Upon receipt of the non-voice message, the emergency message server 18 determines that the message is an emergency non-voice message.

At step 32, the emergency message server 18 queries the public safety answering point (PSAP) configuration database 20 to identity which PSAP serves the current location of the communications device 14. The location of the communications device 14 can be determined via any appropriate means. For example, the communications device 14 and/or the communications network can determine its own geographical location through any type of location determination system including, for example, the Global Positioning System (GPS), assisted GPS (A-GPS), time difference of arrival calculations, configured constant location (in the case of non-moving devices), beacon technologies, any combination thereof. In an example embodiment, the location of the communications device 14 is provided to the emergency message service as part of the non-voice message. At step 34, the PSAP configuration database 20 responds to the query with configuration information for the identified PSAP. In an example configuration, the response provided by the PSAP configuration database 20 includes an indication as to whether the identified PSAP accepts non-voice messages. If the identified PSAP accepts non-voice messages (e.g., the response provided by the PSAP configuration database 20 comprises an indication that the identified PSAP accepts non-voice messages), the non-voice message is routed, by the emergency message server 18, to the identified PSAP 22, at step 36.

In this example embodiment, if the identified PSAP does not accept non-voice messages, as indicated by the response provided at step 34 (e.g., the response message provided by the PSAP configuration database 20 comprises an indication that the identified PSAP does not accept non-voice messages), the emergency message server 18 will not attempt to deliver the non-voice message. Rather, the emergency message server 18 sends, at step 52, a message (e.g., a session initiation protocol, SIP, message) to the telephony network 24 instructing the telephony network 24 to establish a voice path between the indicated subscriber's device (e.g., communications device 14) and the PSAP. And, consequently, the telephony network 24 establishes, at steps 54, 56, and 58, the voice path, wherein the subscriber's device provides an indication of the call, and the voice communication with the PSAP is established.

Figure 5:
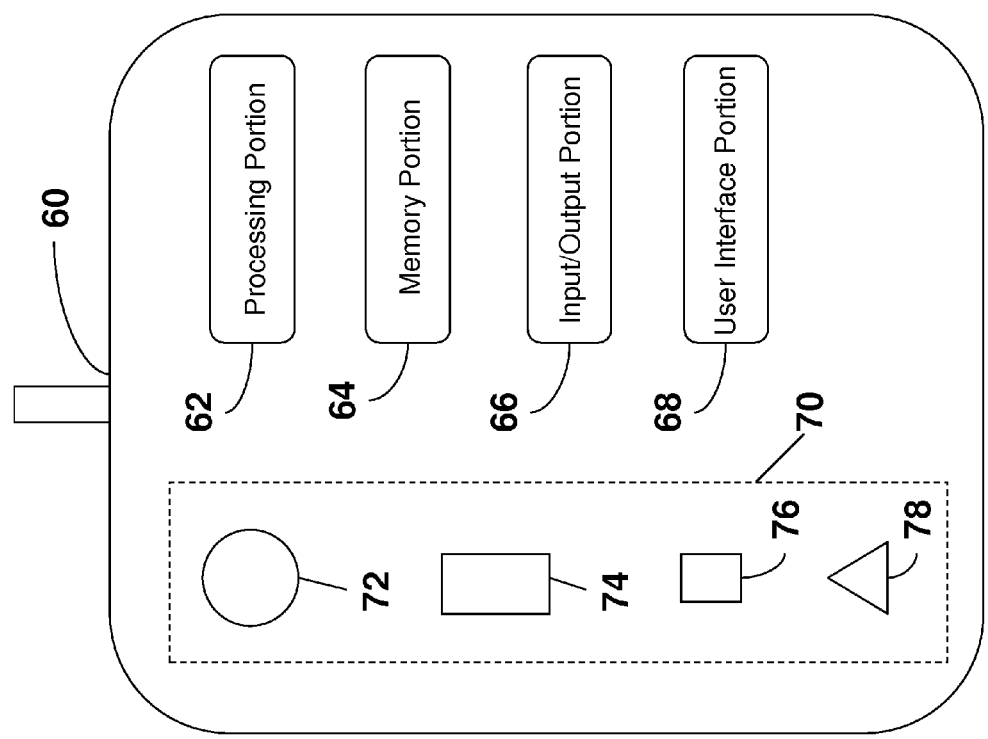
FIG. 5 is a block diagram of an example wireless communications device 90 that is configurable to facilitate an emergency voice call from a non-voice message.

FIG. 5 is a block diagram of an example wireless communications device 90 that is configurable to facilitate a 911 voice call from a non-voice message. The communications device 90 can include any appropriate device, mechanism, software, and/or hardware for facilitating a 911 voice call from a non-voice message as described herein. As described herein, the communications device 90 comprises hardware or a combination of hardware and software. In an example configuration, the communications device 90 comprises a processing portion 92, a memory portion 94, an input/output portion 96, a user interface (UI) portion 98, and a sensor portion 70 comprising at least one of a video camera portion 72, a force/wave sensor 74, a microphone 76, a moisture sensor 78, or a combination thereof. The force/wave sensor comprises at least one of a motion detector, an accelerometer, an acoustic sensor, a tilt sensor, a pressure sensor, a temperature sensor, or the like. The motion detector is configured to detect motion occurring outside of the communications device, for example via disturbance of a standing wave, via electromagnetic and/or acoustic energy, or the like. The accelerator is capable of sensing acceleration, motion, and/or movement of the communications device. The acoustic sensor is capable of sensing acoustic energy, such as a loud noise, for example. The tilt sensor is capable of detecting a tilt of the communications device. The pressure sensor is capable of sensing pressure against the communications device, such as from a shock wave caused by broken glass or the like. The temperature sensor is capable of sensing a measuring temperature, such as inside of the vehicle, room, building, or the like. The moisture sensor 78 is capable of detecting moisture, such as detecting if the communications device 90 is submerged in a liquid. The processing portion 92, memory portion 94, input/output portion 96, user interface (UI) portion 98, video camera portion 72, force/wave sensor 74, and microphone 76 are coupled together to allow communications therebetween (coupling not shown in FIG. 5). The communications device can comprise a timer (not depicted in FIG. 5).

In various embodiments, the input/output portion 96 comprises a receiver of the communications device 90, a transmitter of the communications device 90, or a combination thereof. The input/output portion 96 is capable of receiving and/or providing information pertaining to facilitating a 911 voice call from a non-voice message as described herein. The input/output portion 96 also is capable of communications with the local access network 16 and/or the emergency message server 18, as described herein. For example, the input/output portion 96 can include a wireless communications (e.g., 2.5 G/3 G) SIM card. The input/output portion 96 is capable of receiving and/or sending video information, audio information, control information, image information, data, or any combination thereof. In an example embodiment, the input/output portion 96 is capable of receiving and/or sending information to determine a location of the communications device 90. In an example configuration, the input\output portion 96 comprises a GPS receiver. In an example configuration, the communications device 90 can determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 96 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a WIFI finder, a two way GPS chipset or equivalent, or the like.

The processing portion 92 is capable of facilitating a 911 voice call from a non-voice message as described herein. For example, the processing portion 92 is capable of, in conjunction with any other portion of the communications device 90, executing an application for facilitating a 911 voice call from a non-voice message, communication with an emergency call taker via a text message and/or voice message, generating a text message, generating a voice message, processing a received text message, processing a received voice message, processing a retrieved text message, processing a retrieved voice message, generating a predetermined message, retrieving a predetermined message, processing text messages provided via the user interface portion 98, processing voice messages provided via the user interface portion 98, processing text messages received via the input/output portion 96, processing voice messages received via the input/output portion 96, or the like, or any combination thereof. The processing portion 92, in conjunction with any other portion of the communications device 90, can provide the ability for users/subscribers to enable, disable, and configure various features of an application for facilitating a 911 voice call from a non-voice message, as described herein. For example, a user, subscriber, parent, healthcare provider, law enforcement agent, of the like, can define configuration parameters such as, for example, an emergency contact list, voice/text/image/video options for an emergency call, threshold settings (e.g., timer settings, signature settings, etc.), to be utilized when sending and/or receiving a text/voice message to/from an emergency call taker. The processing portion 92, in conjunction with any other portion of the communications device 90, enables the communications device 90 to covert speech to text when it is configured to send text messages while facilitating a 911 voice call from a non-voice message. In an example embodiment, the processing portion 92, in conjunction with any other portion of the communications device 90, can convert text to speech for rendering via the user interface portion 98.

In a basic configuration, the communications device 90 can include at least one memory portion 94. The memory portion 94 can store any information utilized in conjunction with facilitating communication with an emergency call taker via a text message as described herein. For example, the memory portion 94 is capable of storing information pertaining to a location of a communications device 90, a predetermined text/voice message, a text/voice message, a predetermined audio/text message, an audio/text message, subscriber profile information, subscriber identification information, phone numbers, an identification code of the communications device, video information, audio information, control information, information indicative sensor data (e.g., raw individual sensor information, combination of sensor information, processed sensor information, etc.), or a combination thereof. Depending upon the exact configuration and type of processor, the memory portion 94 can be volatile (such as some types of RAM), non-volatile (such as ROM, flash memory, etc.). The communications device 90 can include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory portion 94, or a portion of the memory portion 92 is hardened such that information stored therein can be recovered if the communications device 90 is exposed to extreme heat, extreme vibration, extreme moisture, corrosive chemicals or gas, or the like. In an example configuration, the information stored in the hardened portion of the memory portion 94 is encrypted, or otherwise rendered unintelligible without use of an appropriate cryptographic key, password, biometric (voiceprint, fingerprint, retinal image, facial image, or the like). Wherein, use of the appropriate cryptographic key, password, biometric will render the information stored in the hardened portion of the memory portion 94 intelligible.

The communications device 90 also can contain a UI portion 98 allowing a user to communicate with the communications device 90. The UI portion 98 is capable of rendering any information utilized in conjunction facilitating a 911 voice call from a non-voice message as described herein. For example, the UI portion 98 can provide means for entering text, entering a phone number, rendering text, rendering images, rendering multimedia, rendering sound, rendering video, receiving sound, or the like, as described herein. The UI portion 98 can provide the ability to control the communications device 90, via, for example, buttons, soft keys, voice actuated controls, a touch screen, movement of the mobile communications device 90, visual cues (e.g., moving a hand in front of a camera on the mobile communications device 90), or the like. The UI portion 98 can provide visual information (e.g., via a display), audio information (e.g., via speaker), mechanically (e.g., via a vibrating mechanism), or a combination thereof. In various configurations, the UI portion 98 can comprise a display, a touch screen, a keyboard, a speaker, or any combination thereof. The UI portion 98 can comprise means for inputting biometric information, such as, for example, fingerprint information, retinal information, voice information, and/or facial characteristic information. The UI portion 98 can be utilized to enter an indication of the designated destination (e.g., the phone number, IP address, or the like).

In an example embodiment, the sensor portion 70 of the communications device 90 comprises the video camera portion 72, the force/wave sensor 74, and the microphone 76. The video camera portion 72 comprises a camera (or cameras) and associated equipment capable of capturing still images and/or video and to provide the captured still images and/or video to other portions of the communications device 90. In an example embodiment, the force/wave sensor 74 comprises an accelerometer, a tilt sensor, an acoustic sensor capable of sensing acoustic energy, an optical sensor (e.g., infrared), or any combination thereof.

Figure 6:
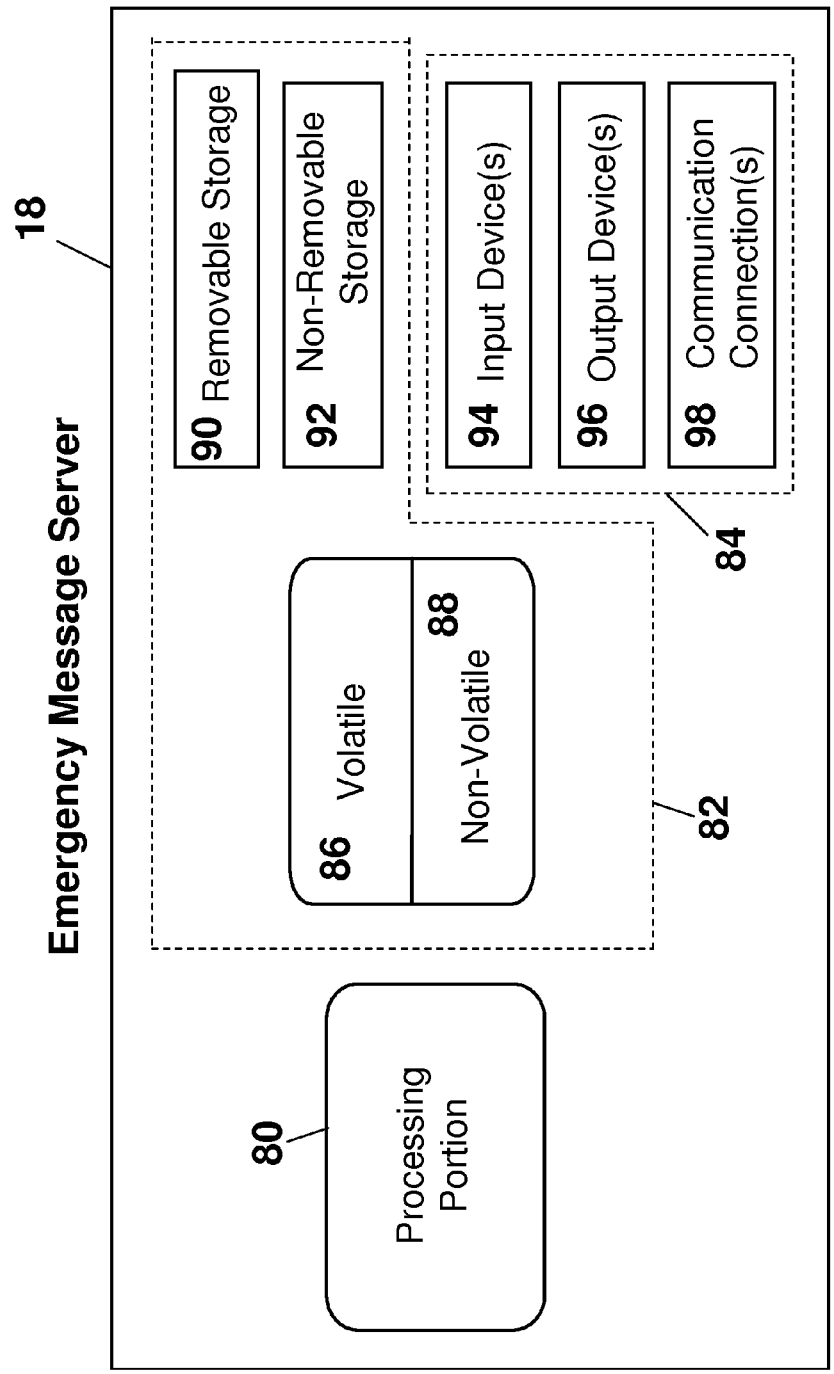
FIG. 6 is a block diagram of an example emergency message server 18.

FIG. 6 is a block diagram of an example emergency message server 18. In an example embodiment, the emergency message server 18 comprises a network entity comprising hardware or a combination of hardware and software. When used in conjunction with a network, the functionality needed to facilitate a 911 voice call from a non-voice message can reside in any one or combination of emergency message servers. The emergency message server 18 depicted in FIG. 6 represents any appropriate network entity, apparatus, or combination of network entities or apparatuses, such as a processor, a server, a gateway, etc., or any combination thereof. It is emphasized that the block diagram depicted in FIG. 6 is exemplary and not intended to imply a specific implementation or configuration. Thus, the emergency message server 18 can be implemented in a single processor or multiple processors (e.g., single server or multiple servers, single gateway or multiple gateways, etc.). Multiple network entities can be distributed or centrally located. Multiple network entities can communicate wirelessly, via hard wire, or a combination thereof.

In an example configuration, the emergency message server 18 comprises a processing portion 80, a memory portion 82, and an input/output portion 84. The processing portion 80, memory portion 82, and input/output portion 84 are coupled together (coupling not shown in FIG. 6) to allow communications therebetween. The input/output portion 84 is capable of receiving and/or providing information from/to a device (e.g., communications device 14) and/or other emergency message servers configured to be utilized when facilitating a 911 voice call from a non-voice message.

The processing portion 80 is capable of performing functions associated with the facilitating a 911 voice call from a non-voice message, as described herein. For example, the input/output portion 82 is capable of, in conjunction with any other portion of the emergency message server 18, generating a text/voice message, processing a received text/voice message, processing a retrieved text/voice message, generating a predetermined message, retrieving a predetermined message, providing a message to a PSAP, receiving a message from a PSAP, providing a message (e.g., query) to a PSAP configuration database, receiving a message (e.g., query response) from a PSAP configuration database, determining a PSAP assigned to handle a location, providing a message to a relay center, receiving a message from a relay center, or the like, or any combination thereof.

The memory portion 82 can store any information utilized in conjunction with facilitating a 911 voice call from a non-voice message, as described herein. For example, the memory portion 82 is capable of storing information pertaining to a location of a communications device 14, a location of a emergency message server 18, a predetermined text message, a text message, a predetermined audio message, an audio message, subscriber profile information, subscriber identification information, phone numbers, an identification code of the communications device, video information, audio information, control information, information pertaining to a call taker handling a session, information pertaining to a PSAP handling a specific area or location, or a combination thereof. Depending upon the exact configuration and type of emergency message server 18, the memory portion 82 can include computer storage media that is volatile 86 (such as dynamic RAM), non-volatile 88 (such as ROM), or a combination thereof. The emergency message server 18 can include additional storage, in the form of computer storage media (e.g., removable storage 90 and/or non-removable storage 92) including, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory. As described herein, a computer storage medium is an article of manufacture.

The emergency message server 18 also can contain communications connection(s) 98 that allow the emergency message server 18 to communicate with other devices, network entities, or the like. A communications connection(s) can comprise communication media. Communication media can be used to communicate computer readable instructions, data structures, program modules, or other data. Communication media can include an appropriate transport mechanism or information delivery media that can be used to transport a modulated data signal such as a carrier wave.

The emergency message server 18 also can include input device(s) 94 such as keyboard, mouse, pen, voice input device, touch input device, etc. Output device(s) 96 such as a display, speakers, printer, etc. also can be included.

The communications device (e.g., communications device 14) and the network entity (emergency message server 18) can be part of and/or in communication with various wireless communications networks. Some of which are described below.

Figure 7:
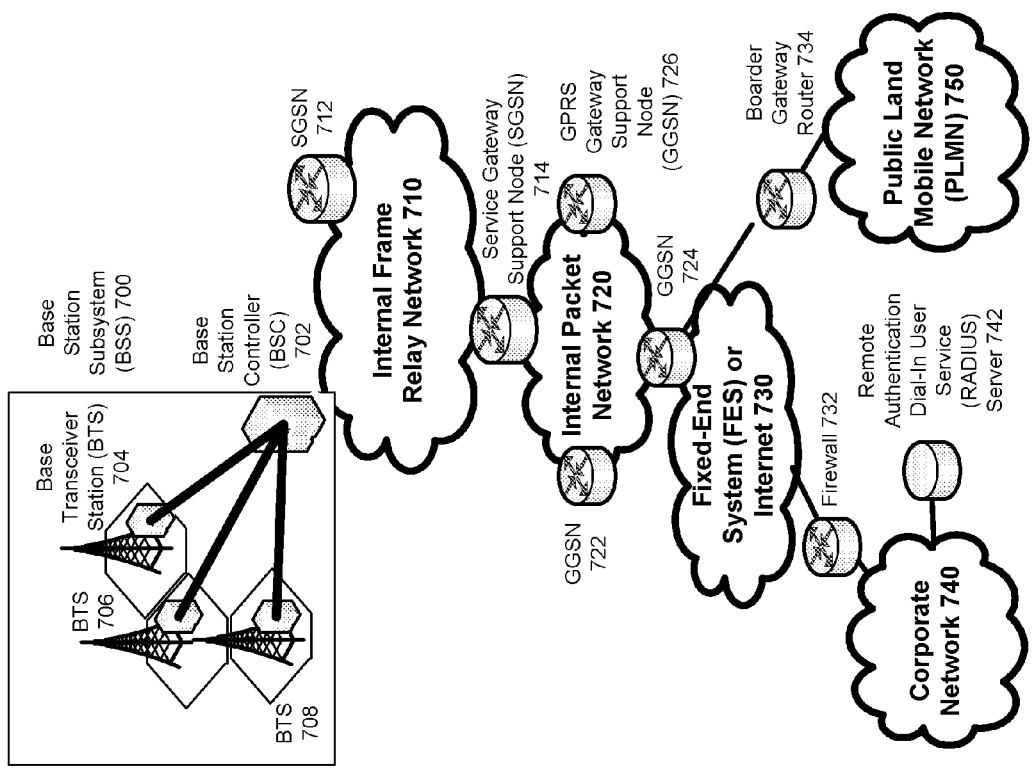
FIG. 7 depicts an overall block diagram of an exemplary packet-based mobile cellular network environment, such as a GPRS network, in which an emergency voice call from a non-voice message can be implemented.

FIG. 7 depicts an overall block diagram of an exemplary packet-based mobile cellular network environment, such as a GPRS network, in which a 911 voice call from a non-voice message can be implemented. In the exemplary packet-based mobile cellular network environment shown in FIG. 7, there are a plurality of Base Station Subsystems ("BSS") 700 (only one is shown), each of which comprises a Base Station Controller ("BSC") 702 serving a plurality of Base Transceiver Stations ("BTS") such as BTSs 704, 706, and 708. BTSs 704, 706, 708, etc. are the access points where users of packet-based mobile devices become connected to the wireless network. In exemplary fashion, the packet traffic originating from user devices is transported via an over-the-air interface to a BTS 708, and from the BTS 708 to the BSC 702. Base station subsystems, such as BSS 700, are a part of internal frame relay network 710 that can include Service GPRS Support Nodes ("SGSN") such as SGSN 712 and 714. Each SGSN is connected to an internal packet network 720 through which a SGSN 712, 714, etc. can route data packets to and from a plurality of gateway GPRS support nodes (GGSN) 722, 724, 726, etc. As illustrated, SGSN 714 and GGSNs 722, 724, and 726 are part of internal packet network 720. Gateway GPRS serving nodes 722, 724 and 726 mainly provide an interface to external Internet Protocol ("IP") networks such as Public Land Mobile Network ("PLMN") 750, corporate intranets 740, or Fixed-End System ("FES") or the public Internet 730. As illustrated, subscriber corporate network 740 may be connected to GGSN 724 via firewall 732; and PLMN 750 is connected to GGSN 724 via boarder gateway router 734. The Remote Authentication Dial-In User Service ("RADIUS") server 742 may be used for caller authentication when a user of a mobile cellular device calls corporate network 740.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 8:
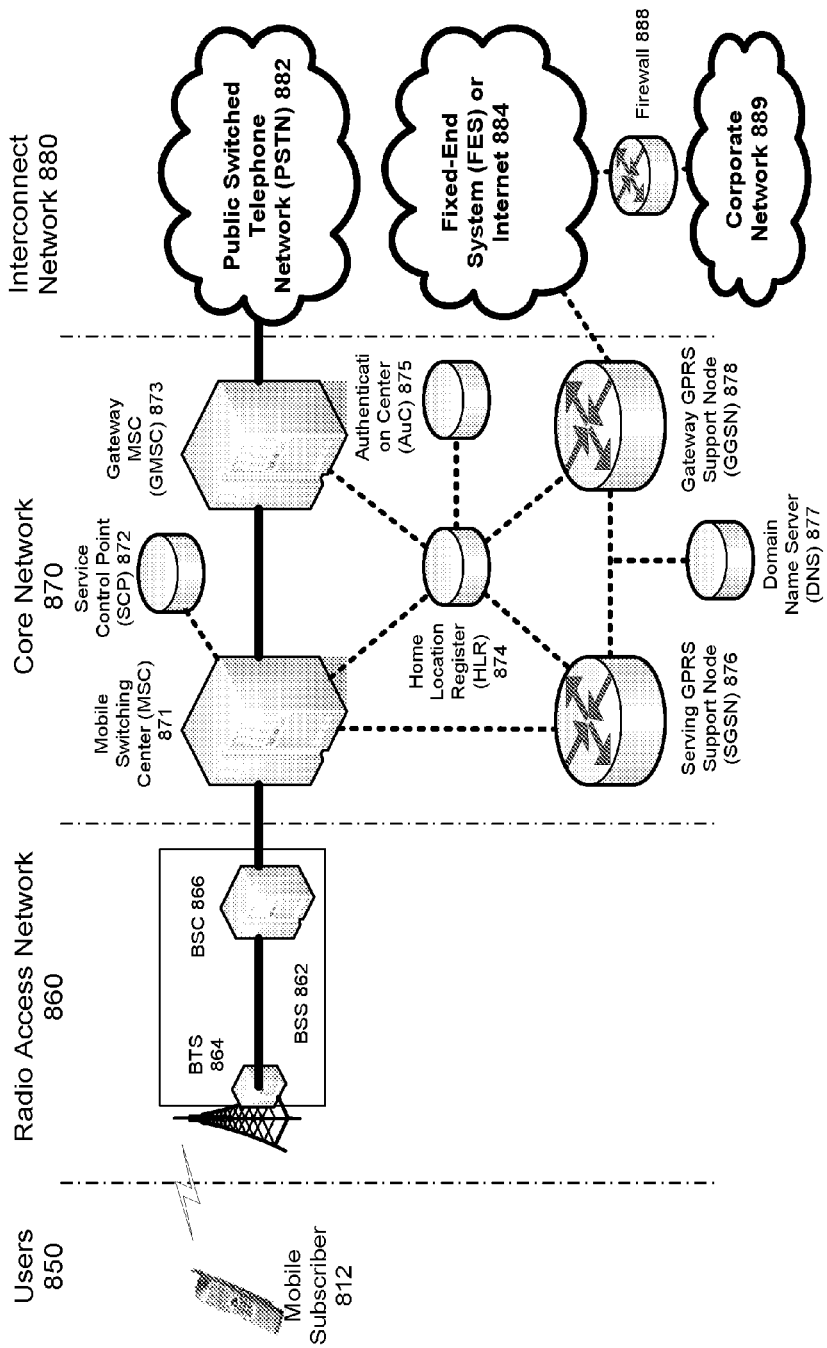
FIG. 8 illustrates an architecture of a typical GPRS network in which an emergency voice call from a non-voice message can be implemented.

FIG. 8 illustrates an architecture of a typical GPRS network in which a 911 voice call from a non-voice message can be implemented. The architecture depicted in FIG. 8 is segmented into four groups: users 850, radio access network 860, core network 870, and interconnect network 880. Users 850 comprise a plurality of end users. Note, device 812 is referred to as a mobile subscriber in the description of network shown in FIG. 8. In an example embodiment, the device depicted as mobile subscriber 812 comprises a communications device (e.g., wireless anti-theft security communications device 14). Radio access network 860 comprises a plurality of base station subsystems such as BSSs 862, which include BTSs 864 and BSCs 866. Core network 870 comprises a host of various network elements. As illustrated in FIG. 8, core network 870 may comprise Mobile Switching Center ("MSC") 871, Service Control Point ("SCP") 872, gateway MSC 873, SGSN 876, Home Location Register ("HLR") 874, Authentication Center ("AuC") 875, Domain Name Server ("DNS") 877, and GGSN 878. Interconnect network 880 also comprises a host of various networks and other network elements. As illustrated in FIG. 8, interconnect network 880 comprises Public Switched Telephone Network ("PSTN") 882, Fixed-End System ("FES") or Internet 884, firewall 888, and Corporate Network 889.

A mobile switching center can be connected to a large number of base station controllers. At MSC 871, for instance, depending on the type of traffic, the traffic may be separated in that voice may be sent to Public Switched Telephone Network ("PSTN") 882 through Gateway MSC ("GMSC") 873, and/or data may be sent to SGSN 876, which then sends the data traffic to GGSN 878 for further forwarding.

When MSC 871 receives call traffic, for example, from BSC 866, it sends a query to a database hosted by SCP 872. The SCP 872 processes the request and issues a response to MSC 871 so that it may continue call processing as appropriate.

The HLR 874 is a centralized database for users to register to the GPRS network. HLR 874 stores static information about the subscribers such as the International Mobile Subscriber Identity ("IMSI"), subscribed services, and a key for authenticating the subscriber. HLR 874 also stores dynamic subscriber information such as the current location of the mobile subscriber. Associated with HLR 874 is AuC 875. AuC 875 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 8, when mobile subscriber 812 initiates the attach process by turning on the network capabilities of the mobile device, an attach request is sent by mobile subscriber 812 to SGSN 876. The SGSN 876 queries another SGSN, to which mobile subscriber 812 was attached before, for the identity of mobile subscriber 812. Upon receiving the identity of mobile subscriber 812 from the other SGSN, SGSN 876 requests more information from mobile subscriber 812. This information is used to authenticate mobile subscriber 812 to SGSN 876 by HLR 874. Once verified, SGSN 876 sends a location update to HLR 874 indicating the change of location to a new SGSN, in this case SGSN 876. HLR 874 notifies the old SGSN, to which mobile subscriber 812 was attached before, to cancel the location process for mobile subscriber 812. HLR 874 then notifies SGSN 876 that the location update has been performed. At this time, SGSN 876 sends an Attach Accept message to mobile subscriber 812, which in turn sends an Attach Complete message to SGSN 876.

After attaching itself with the network, mobile subscriber 812 then goes through the authentication process. In the authentication process, SGSN 876 sends the authentication information to HLR 874, which sends information back to SGSN 876 based on the user profile that was part of the user's initial setup. The SGSN 876 then sends a request for authentication and ciphering to mobile subscriber 812. The mobile subscriber 812 uses an algorithm to send the user identification (ID) and password to SGSN 876. The SGSN 876 uses the same algorithm and compares the result. If a match occurs, SGSN 876 authenticates mobile subscriber 812.

Next, the mobile subscriber 812 establishes a user session with the destination network, corporate network 889, by going through a Packet Data Protocol ("PDP") activation process. Briefly, in the process, mobile subscriber 812 requests access to the Access Point Name ("APN"), for example, UPS.com, and SGSN 876 receives the activation request from mobile subscriber 812. SGSN 876 then initiates a Domain Name Service ("DNS") query to learn which GGSN node has access to the UPS.com APN. The DNS query is sent to the DNS server within the core network 870, such as DNS 877, which is provisioned to map to one or more GGSN nodes in the core network 870. Based on the APN, the mapped GGSN 878 can access the requested corporate network 889. The SGSN 876 then sends to GGSN 878 a Create Packet Data Protocol ("PDP") Context Request message that contains necessary information. The GGSN 878 sends a Create PDP Context Response message to SGSN 876, which then sends an Activate PDP Context Accept message to mobile subscriber 812.

Once activated, data packets of the call made by mobile subscriber 812 can then go through radio access network 860, core network 870, and interconnect network 880, in a particular fixed-end system or Internet 884 and firewall 888, to reach corporate network 889.

Figure 9:
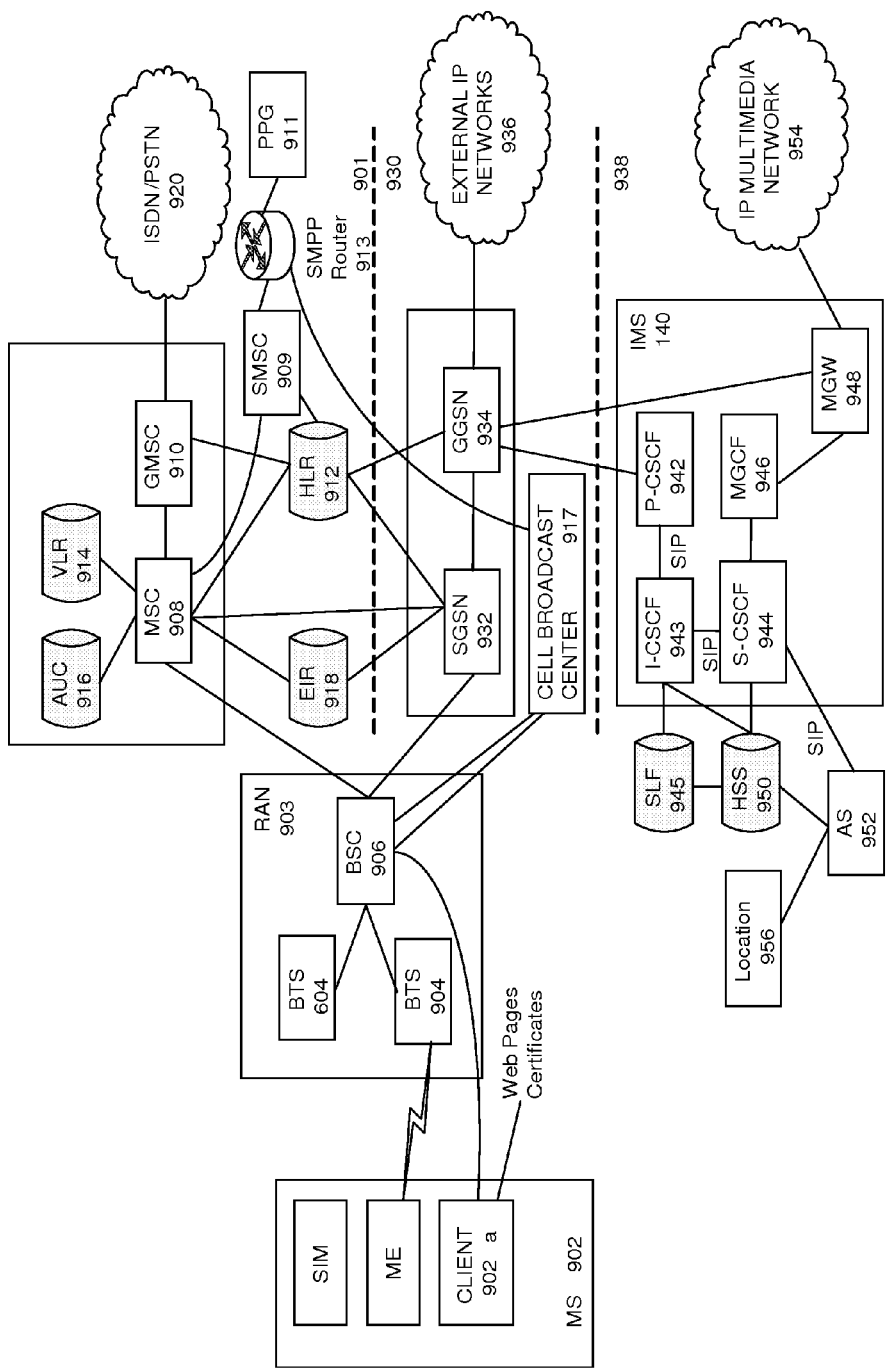
FIG. 9 illustrates an exemplary block diagram view of a GSM/GPRS/IP multimedia network architecture within which an emergency voice call from a non-voice message can be implemented.

FIG. 9 illustrates an exemplary block diagram view of a GSM/GPRS/IP multimedia network architecture within which a 911 voice call from a non-voice message can be implemented. As illustrated, the architecture of FIG. 9 includes a GSM core network 901, a GPRS network 930 and an IP multimedia network 938. The GSM core network 901 includes a Mobile Station (MS) 902, at least one Base Transceiver Station (BTS) 904 and a Base Station Controller (BSC) 906. The MS 902 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 904 is physical equipment, such as a radio tower, that enables a radio interface to communicate with the MS. Each BTS may serve more than one MS. The BSC 906 manages radio resources, including the BTS. The BSC may be connected to several BTSs. The BSC and BTS components, in combination, are generally referred to as a base station (BSS) or radio access network (RAN) 903.

The GSM core network 901 also includes a Mobile Switching Center (MSC) 908, a Gateway Mobile Switching Center (GMSC) 910, a Home Location Register (HLR) 912, Visitor Location Register (VLR) 914, an Authentication Center (AuC) 918, and an Equipment Identity Register (EIR) 916. The MSC 908 performs a switching function for the network. The MSC also performs other functions, such as registration, authentication, location updating, handovers, and call routing. The GMSC 910 provides a gateway between the GSM network and other networks, such as an Integrated Services Digital Network (ISDN) or Public Switched Telephone Networks (PSTNs) 920. Thus, the GMSC 910 provides interworking functionality with external networks.

The HLR 912 is a database that contains administrative information regarding each subscriber registered in a corresponding GSM network. The HLR 912 also contains the current location of each MS. The VLR 914 is a database that contains selected administrative information from the HLR 912. The VLR contains information necessary for call control and provision of subscribed services for each MS currently located in a geographical area controlled by the VLR. The HLR 912 and the VLR 914, together with the MSC 908, provide the call routing and roaming capabilities of GSM. The AuC 916 provides the parameters needed for authentication and encryption functions. Such parameters allow verification of a subscriber's identity. The EIR 918 stores security-sensitive information about the mobile equipment.

A Short Message Service Center (SMSC) 909 allows one-to-one Short Message Service (SMS) messages to be sent to/from the MS 902. A Push Proxy Gateway (PPG) 911 is used to "push" (i.e., send without a synchronous request) content to the MS 902. The PPG 911 acts as a proxy between wired and wireless networks to facilitate pushing of data to the MS 902. A Short Message Peer to Peer (SMPP) protocol router 913 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 902 sends a location update including its current location information to the MSC/VLR, via the BTS 904 and the BSC 906. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 930 is logically implemented on the GSM core network architecture by introducing two packet-switching network nodes, a serving GPRS support node (SGSN) 932, a cell broadcast and a Gateway GPRS support node (GGSN) 934. The SGSN 932 is at the same hierarchical level as the MSC 908 in the GSM network. The SGSN controls the connection between the GPRS network and the MS 902. The SGSN also keeps track of individual MS's locations and security functions and access controls.

A Cell Broadcast Center (CBC) 917 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 934 provides a gateway between the GPRS network and a public packet network (PDN) or other IP networks 936. That is, the GGSN provides interworking functionality with external networks, and sets up a logical link to the MS through the SGSN. When packet-switched data leaves the GPRS network, it is transferred to an external TCP-IP network 936, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 930 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 938 was introduced with 3GPP Release 9, and includes an IP multimedia subsystem (IMS) 940 to provide rich multimedia services to end users. A representative set of the network entities within the IMS 940 are a call/session control function (CSCF), a media gateway control function (MGCF) 946, a media gateway (MGW) 948, and a master subscriber database, called a home subscriber server (HSS) 950. The HSS 950 may be common to the GSM network 901, the GPRS network 930 as well as the IP multimedia network 938.

The IP multimedia system 940 is built around the call/session control function, of which there are three types: an interrogating CSCF (I-CSCF) 943, a proxy CSCF (P-CSCF) 942, and a serving CSCF (S-CSCF) 944. The P-CSCF 942 is the MS's first point of contact with the IMS 940. The P-CSCF 942 forwards session initiation protocol (SIP) messages received from the MS to an SIP server in a home network (and vice versa) of the MS. The P-CSCF 942 may also modify an outgoing request according to a set of rules defined by the network operator (for example, address analysis and potential modification).

The I-CSCF 943, forms an entrance to a home network and hides the inner topology of the home network from other networks and provides flexibility for selecting an S-CSCF. The I-CSCF 943 may contact a subscriber location function (SLF) 945 to determine which HSS 950 to use for the particular subscriber, if multiple HSS's 950 are present. The S-CSCF 944 performs the session control services for the MS 902. This includes routing originating sessions to external networks and routing terminating sessions to visited networks. The S-CSCF 944 also decides whether an application server (AS) 952 is required to receive information on an incoming SIP session request to ensure appropriate service handling. This decision is based on information received from the HSS 950 (or other sources, such as an application server 952). The AS 952 also communicates to a location server 956 (e.g., a Gateway Mobile Location Center (GMLC)) that provides a position (e.g., latitude/longitude coordinates) of the MS 902.

The HSS 950 contains a subscriber profile and keeps track of which core network node is currently handling the subscriber. It also supports subscriber authentication and authorization functions (AAA). In networks with more than one HSS 950, a subscriber location function provides information on the HSS 950 that contains the profile of a given subscriber.

The MGCF 946 provides interworking functionality between SIP session control signaling from the IMS 940 and ISUP/BICC call control signaling from the external GSTN networks (not shown). It also controls the media gateway (MGW) 948 that provides user-plane interworking functionality (e.g., converting between AMR- and PCM-coded voice). The MGW 948 also communicates with other IP multimedia networks 954.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 10:
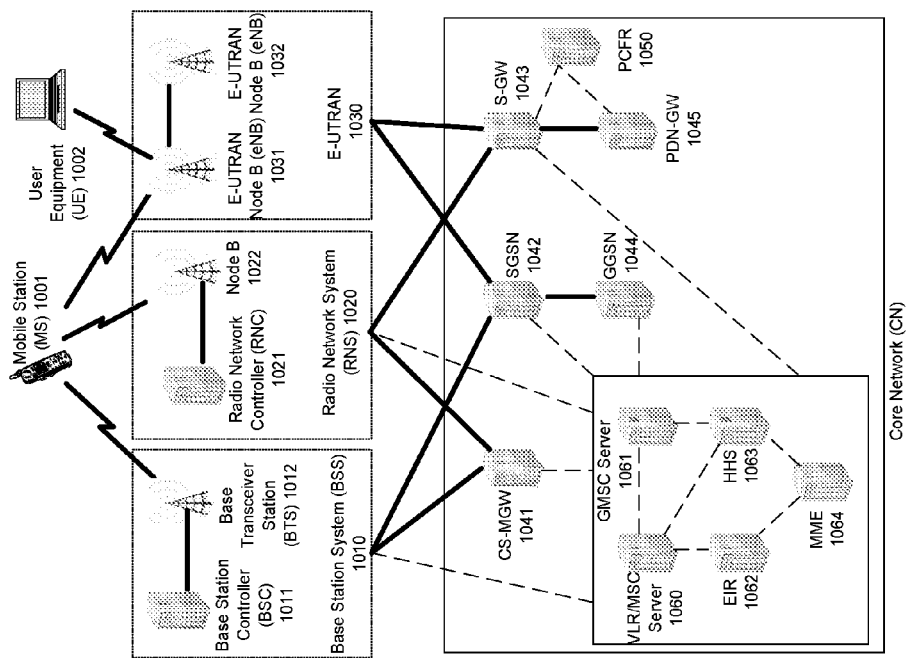
FIG. 10 illustrates a PLMN block diagram view of an exemplary architecture in which an emergency voice call from a non-voice message may be incorporated.

FIG. 10 illustrates a PLMN block diagram view of an exemplary architecture in which a 911 voice call from a non-voice message may be incorporated. Mobile Station (MS) 1001 is the physical equipment used by the PLMN subscriber. In one illustrative embodiment, communications device 40 may serve as Mobile Station 1001. Mobile Station 1001 may be one of, but not limited to, a cellular telephone, a cellular telephone in combination with another electronic device or any other wireless mobile communication device.

Mobile Station 1001 may communicate wirelessly with Base Station System (BSS) 1010. BSS 1010 contains a Base Station Controller (BSC) 1011 and a Base Transceiver Station (BTS) 1012. BSS 1010 may include a single BSC 1011/BTS 1012 pair (Base Station) or a system of BSC/BTS pairs which are part of a larger network. BSS 1010 is responsible for communicating with Mobile Station 1001 and may support one or more cells. BSS 1010 is responsible for handling cellular traffic and signaling between Mobile Station 1001 and Core Network 1040. Typically, BSS 1010 performs functions that include, but are not limited to, digital conversion of speech channels, allocation of channels to mobile devices, paging, and transmission/reception of cellular signals.

Additionally, Mobile Station 1001 may communicate wirelessly with Radio Network System (RNS) 1020. RNS 1020 contains a Radio Network Controller (RNC) 1021 and one or more Node(s) B 1022. RNS 1020 may support one or more cells. RNS 1020 may also include one or more RNC 1021/Node B 1022 pairs or alternatively a single RNC 1021 may manage multiple Nodes B 1022. RNS 1020 is responsible for communicating with Mobile Station 1001 in its geographically defined area. RNC 1021 is responsible for controlling the Node(s) B 1022 that are connected to it and is a control element in a UMTS radio access network. RNC 1021 performs functions such as, but not limited to, load control, packet scheduling, handover control, security functions, as well as controlling Mobile Station 1001's access to the Core Network (CN) 1040.

The evolved UMTS Terrestrial Radio Access Network (E-UTRAN) 1030 is a radio access network that provides wireless data communications for Mobile Station 1001 and User Equipment 1002. E-UTRAN 1030 provides higher data rates than traditional UMTS. It is part of the Long Term Evolution (LTE) upgrade for mobile networks and later releases meet the requirements of the International Mobile Telecommunications (IMT) Advanced and are commonly known as a 4 G networks. E-UTRAN 1030 may include of series of logical network components such as E-UTRAN Node B (eNB) 1031 and E-UTRAN Node B (eNB) 1032. E-UTRAN 1030 may contain one or more eNBs. User Equipment 1002 may be any user device capable of connecting to E-UTRAN 1030 including, but not limited to, a personal computer, laptop, mobile device, wireless router, or other device capable of wireless connectivity to E-UTRAN 1030. The improved performance of the E-UTRAN 1030 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 10 is the Enhanced Data rates for GSM Evolution (EDGE). EDGE is an enhancement for GPRS networks that implements an improved signal modulation scheme known as 10-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1001 may communicate with any or all of BSS 1010, RNS 1020, or E-UTRAN 1030. In a illustrative system, each of BSS 1010, RNS 1020, and E-UTRAN 1030 may provide Mobile Station 1001 with access to Core Network 1040. The Core Network 1040 may include of a series of devices that route data and communications between end users. Core Network 1040 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1041 is part of Core Network 1040, and interacts with Visitor Location Register (VLR) and Mobile-Services Switching Center (MSC) Server 1060 and Gateway MSC Server 1061 in order to facilitate Core Network 1040 resource control in the CS domain. Functions of CS-MGW 1041 include, but are not limited to, media conversion, bearer control, payload processing and other mobile network processing such as handover or anchoring. CS-MGW 1040 may receive connections to Mobile Station 1001 through BSS 1010, RNS 1020 or both.

Serving GPRS Support Node (SGSN) 1042 stores subscriber data regarding Mobile Station 1001 in order to facilitate network functionality. SGSN 1042 may store subscription information such as, but not limited to, the International Mobile Subscriber Identity (IMSI), temporary identities, or Packet Data Protocol (PDP) addresses. SGSN 1042 may also store location information such as, but not limited to, the Gateway GPRS Support Node (GGSN) 1044 address for each GGSN where an active PDP exists. GGSN 1044 may implement a location register function to store subscriber data it receives from SGSN 1042 such as subscription or location information.

Serving Gateway (S-GW) 1043 is an interface which provides connectivity between E-UTRAN 1030 and Core Network 1040. Functions of S-GW 1043 include, but are not limited to, packet routing, packet forwarding, transport level packet processing, event reporting to Policy and Charging Rules Function (PCRF) 1050, and mobility anchoring for inter-network mobility. PCRF 1050 uses information gathered from S-GW 1043, as well as other sources, to make applicable policy and charging decisions related to data flows, network resources and other network administration functions. Packet Data Network Gateway (PDN-GW) 1045 may provide user-to-services connectivity functionality including, but not limited to, network-wide mobility anchoring, bearer session anchoring and control, and IP address allocation for PS domain connections.

Home Subscriber Server (HSS) 1063 is a database for user information, and stores subscription data regarding Mobile Station 1001 or User Equipment 1002 for handling calls or data sessions. Networks may contain one HSS 1063 or more if additional resources are required. Exemplary data stored by HSS 1063 include, but is not limited to, user identification, numbering and addressing information, security information, or location information. HSS 1063 may also provide call or session establishment procedures in both the PS and CS domains.

The VLR/MSC Server 1060 provides user location functionality. When Mobile Station 1001 enters a new network location, it begins a registration procedure. A MSC Server for that location transfers the location information to the VLR for the area. A VLR and MSC Server may be located in the same computing environment, as is shown by VLR/MSC Server 1060, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1001 registration or procedures for handover of Mobile Station 1001 to a different section of the Core Network 1040. GMSC Server 1061 may serve as a connection to alternate GMSC Servers for other mobile stations in larger networks.

Equipment Identity Register (EIR) 1062 is a logical element which may store the International Mobile Equipment Identities (IMEI) for Mobile Station 1001. In a typical embodiment, user equipment may be classified as either "white listed" or "black listed" depending on its status in the network. In one embodiment, if Mobile Station 1001 is stolen and put to use by an unauthorized user, it may be registered as "black listed" in EIR 1062, preventing its use on the network. Mobility Management Entity (MME) 1064 is a control node which may track Mobile Station 1001 or User Equipment 1002 if the devices are idle. Additional functionality may include the ability of MME 1064 to contact an idle Mobile Station 1001 or User Equipment 1002 if retransmission of a previous session is required.

While example embodiments of triggering a 911 voice call from a non-voice message have been described in connection with various computing devices/processors, the underlying concepts can be applied to any computing device, processor, or system capable of facilitating a 911 voice call from a non-voice message as described herein. The methods and apparatuses for triggering a 911 voice call from a non-voice message, or certain aspects or portions thereof, can take the form of program code (i.e., instructions) embodied in tangible storage media having a physical structure, such as floppy diskettes, CD-ROMs, hard drives, or any other machine-readable storage medium having a physical tangible structure (computer-readable storage medium), wherein, when the program code is loaded into and executed by a machine, such as a computer, the machine becomes an apparatus for implementing a 911 voice call from a non-voice message. A computer-readable storage medium, as described herein is an article of manufacture, and thus, not to be construed as a transitory signal. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for triggering a 911 voice call from a non-voice message can be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, or the like, the machine becomes an apparatus for facilitating a 911 voice call from a non-voice message. When implemented on a general-purpose processor, the program code combines with the processor to provide a unique apparatus that operates to invoke the functionality of triggering a 911 voice call from a non-voice message.

While triggering a 911 voice call from a non-voice message has been described in connection with the various embodiments of the various figures, it is to be understood that other similar embodiments can be used or modifications and additions can be made to the described embodiments for triggering a 911 voice call from a non-voice message. For example, one skilled in the art will recognize that triggering a 911 voice call from a non-voice message as described in the present application may apply to any environment, whether wired or wireless, and may be applied to any number of devices connected via a communications network and interacting across the network. Therefore, triggering a 911 voice call from a non-voice message should not be limited to any single embodiment, but rather should be construed in breadth and scope in accordance with the appended claims.

What is claimed:

1. A method comprising:
receiving a non-voice based emergency call;
determining a location of a device from which the non-voice based emergency call was provided;
identifying a public safety answering point (PSAP) that serves the location;
determining that the identified PSAP does not support non-voice based calls; and
providing a notification message, the notification message comprising an indication to initiate a voice based call between the device and the identified PSAP.

2. The method of claim 1, wherein the provided notification message is intended for the identified PSAP.

3. The method of claim 1, wherein the provided notification message is intended for the device.

4. The method of claim 1, wherein the provided notification message is intended for an entity in a telephony network.

5. The method of claim 1, the provided notification message comprising an email.

6. The method of claim 1, the provided notification message comprising a voice based message.

7. The method of claim 1, the provided notification message being intended for an individual call taker of the identified PSAP.

8. An apparatus comprising:
an input/output portion configured to:
receive a non-voice based emergency call; and
provide a notification message comprising an indication to initiate a voice based call between a device and an identified public safety answering point (PSAP); and
a processing portion configured to:
determine a location of the device from which the non-voice based emergency call was provided;
identify the PSAP that serves the location; and
determine that the identified PSAP does not support non-voice based calls.

9. The apparatus of claim 8, wherein the provided notification message is for the identified PSAP.

10. The apparatus of claim 8, wherein the provided notification message is intended for the device.

11. The apparatus of claim 8, the provided notification message being intended for an entity in a telephony network.

12. The apparatus of claim 8, the provided notification message comprising an email.

13. The apparatus of claim 8, the provided notification message comprising a voice based message.

14. The apparatus of claim 8, the provided notification message being intended for an individual call taker of the identified PSAP.

15. A method comprising:
receiving a non-voice based emergency call;
determining a location of a device from which the non-voice based emergency call was provided;
identifying a public safety answering point (PSAP) that serves the location;
determining if the identified PSAP supports non-voiced based calls;
when it is determined that the identified PSAP supports non-voiced based calls, providing the non-voice based emergency call to the identified PSAP; and
when it is determined that the identified PSAP does not support non-voice based calls, providing a notification message, the notification message comprising an indication to initiate a voice based call between the device and the identified PSAP.

16. The method of claim 15, wherein the provided notification message is intended for the identified PSAP.

17. The method of claim 15, wherein the provided notification message is intended for the device.

18. The method of claim 15, wherein the provided notification message is intended for an entity in a telephony network.

19. The method of claim 15, the provided notification message comprising an email.

20. The method of claim 15, the provided notification message comprising a voice based message.

* * * * *